United States Patent [19]

Jones

[11] Patent Number: 5,655,712
[45] Date of Patent: Aug. 12, 1997

[54] AIR CUSHIONED SPRAYING APPARATUS

[75] Inventor: Derek Jones, Hamilton, Canada

[73] Assignee: A.C. Sprayers Inc., Hamilton, Canada

[21] Appl. No.: 452,467

[22] Filed: May 26, 1995

[30] Foreign Application Priority Data

May 31, 1994 [GB] United Kingdom ............ 9410821

[51] Int. Cl.$^6$ ............................ B05B 1/28; B05B 15/04
[52] U.S. Cl. ............. 239/147; 239/172; 239/754; 239/288.5
[58] Field of Search ............... 239/77, 78, 146, 239/147, 159, 163–169, 172, 175, 176, 722, 754, 288–288.5; 180/116–130

[56] References Cited

U.S. PATENT DOCUMENTS

| | | | |
|---|---|---|---|
| 3,341,125 | 9/1967 | Sweeney et al. | 180/117 X |
| 3,439,875 | 4/1969 | Randall et al. | 180/128 X |
| 3,512,714 | 5/1970 | Phelps et al. | 239/159 X |
| 3,666,178 | 5/1972 | Crimmins et al. | 239/172 X |
| 3,804,332 | 4/1974 | Welch | 239/168 X |
| 4,274,589 | 6/1981 | Jones | 239/288.5 X |
| 4,290,500 | 9/1981 | Hopkins et al. | 239/159 X |
| 4,646,971 | 3/1987 | Rogers | 239/288.5 X |
| 5,431,341 | 7/1995 | Broyhill | 239/172 X |

Primary Examiner—Lesley D. Morris

[57] ABSTRACT

Air cushioned spraying apparatus for spraying vegetation with chemicals while being supported above the ground by an air cushion effect has a unit with at least three air cushion cells. Each cell has a substantially cylindrical rigid body with a closed upper end and an open lower end, and a flexible skirt secured to and extending around the periphery of the open lower end of the rigid body. Each cell also has a spray nozzle projecting downwardly into the body from the closed upper end and an air inlet in the body adjacent the upper end thereof. The cells are connected together so that the path of travel of each cell laterally overlaps the path of travel of another cell. Air under pressure is supplied to the cell inlets to cause air to pass therethrough and downwardly in the cell body to disperse the chemicals from the nozzle onto vegetation within the lower open end of the cell and to cause air to pass from the cell between the flexible skirt and the ground to create an air cushion effect.

6 Claims, 3 Drawing Sheets 5,655,712

AIR CUSHIONED SPRAYING APPARATUS

FIELD OF THE INVENTION

This invention relates to air cushioned spraying apparatus for spraying vegetation with chemicals such as herbicides, fungicides, fertilizers or weed killers. In use, such spraying apparatus is supported above the ground by an air cushion effect.

BACKGROUND OF THE INVENTION

Air cushioned spraying apparatus for spraying the vegetation with liquid chemicals is known, see for example U.S. Pat. No. 4,274,589 (Jones) issued Jun. 23, 1981, the contents of which are hereby incorporated herein by reference. However, although the spraying apparatus described in this patent is very useful for many spraying operations, there is still a need for air cushioned spraying apparatus which is suitable for use on uneven ground. It is therefore an object of the invention to provide air cushioned spraying apparatus which is capable of readily adapting to uneven ground.

SUMMARY OF THE INVENTION

According to the invention, air cushioned apparatus comprises a unit with at least three air cushion cells, each air cushion cell having a substantially cylindrical rigid body with a closed upper end and an open lower end, and a flexible skirt secured to and extending around the periphery of the open lower end of the rigid body, each cell also having a spray nozzle projecting downwardly into the body from the closed upper end and an air inlet in the body adjacent the upper end thereof. The unit also has connecting means connecting the cells of the unit such that, when the apparatus is in use moving in the direction of travel, the path of travel of each cell laterally overlaps the path of travel of the other cell. The apparatus also has supply means for supplying chemicals to the spray nozzles, and air supply means for supplying air under pressure to the cell inlets to cause air to pass downwardly in the cell body to disperse the chemicals from the nozzle onto vegetation within the lower upper end of the cell and to cause air to pass from the cell between the flexible skirt and the ground to create an air cushion effect.

Each unit may have three cells consisting of a pair of side-by-side cells, and a third cell forwardly or rearwardly thereof relative to the direction of travel.

The connecting means may comprise a support means connected to the upper closed end of the cells, and the air supply means may comprise a motor and fan carried by the support means.

Advantageously, the cell inlets are shaped to cause air under pressure to enter into the cells in a substantially tangential manner.

The apparatus may have a middle three-cell unit with the third cell forwardly of the other two cells, and two outer three-cell units, one on each side of the central unit, the third cell of each outer unit being rearwardly of the other two cells.

BRIEF DESCRIPTION OF THE DRAWINGS

Embodiments of the invention will now be described, by way of example, with reference to the accompanying drawings, of which.

DETAILED DESCRIPTION OF PREFERRED EMBODIMENTS

Figure 1:
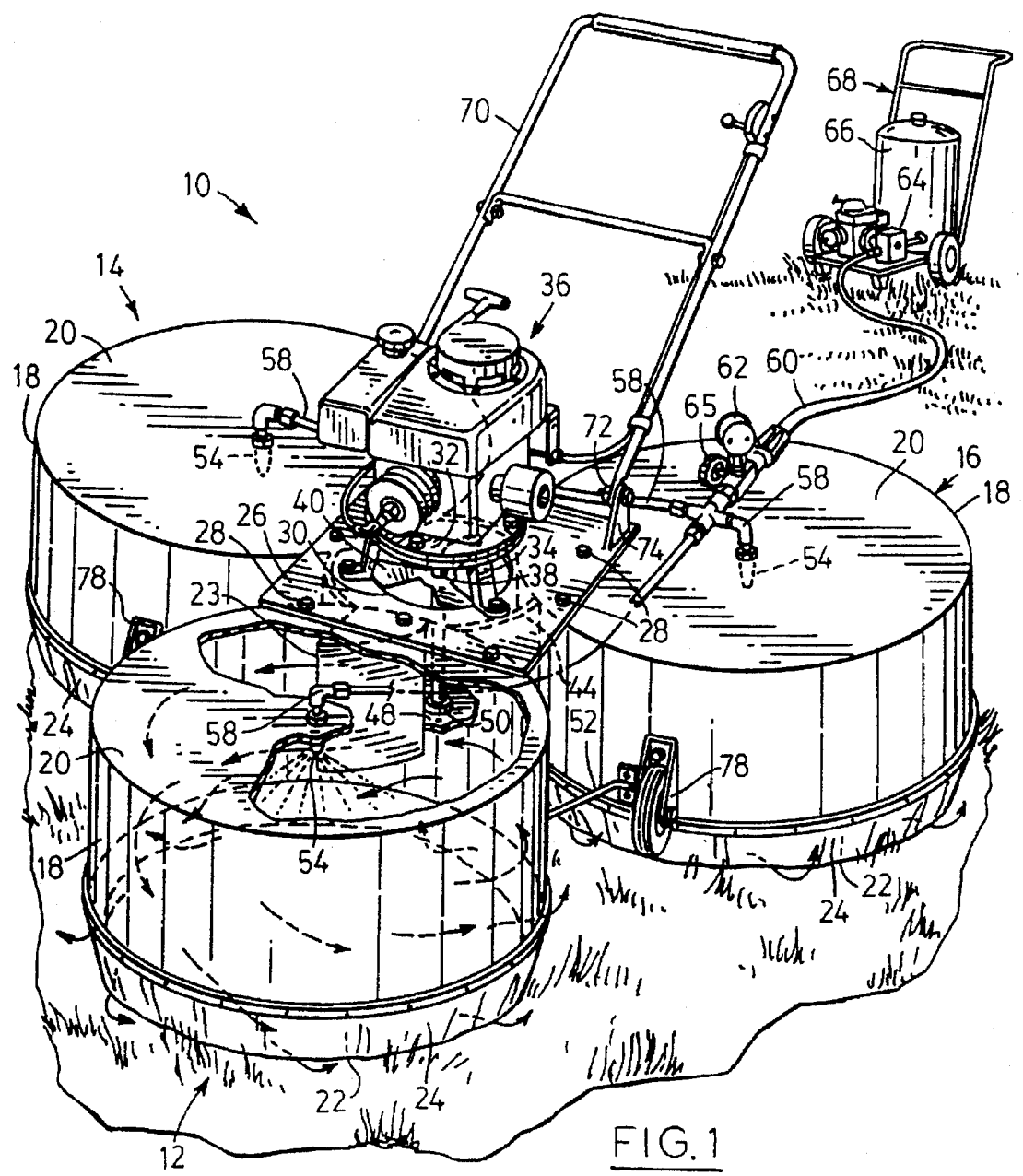
FIG. 1 is a perspective view of an air cushioned spraying apparatus in accordance with one embodiment of the invention.
Figure 2:
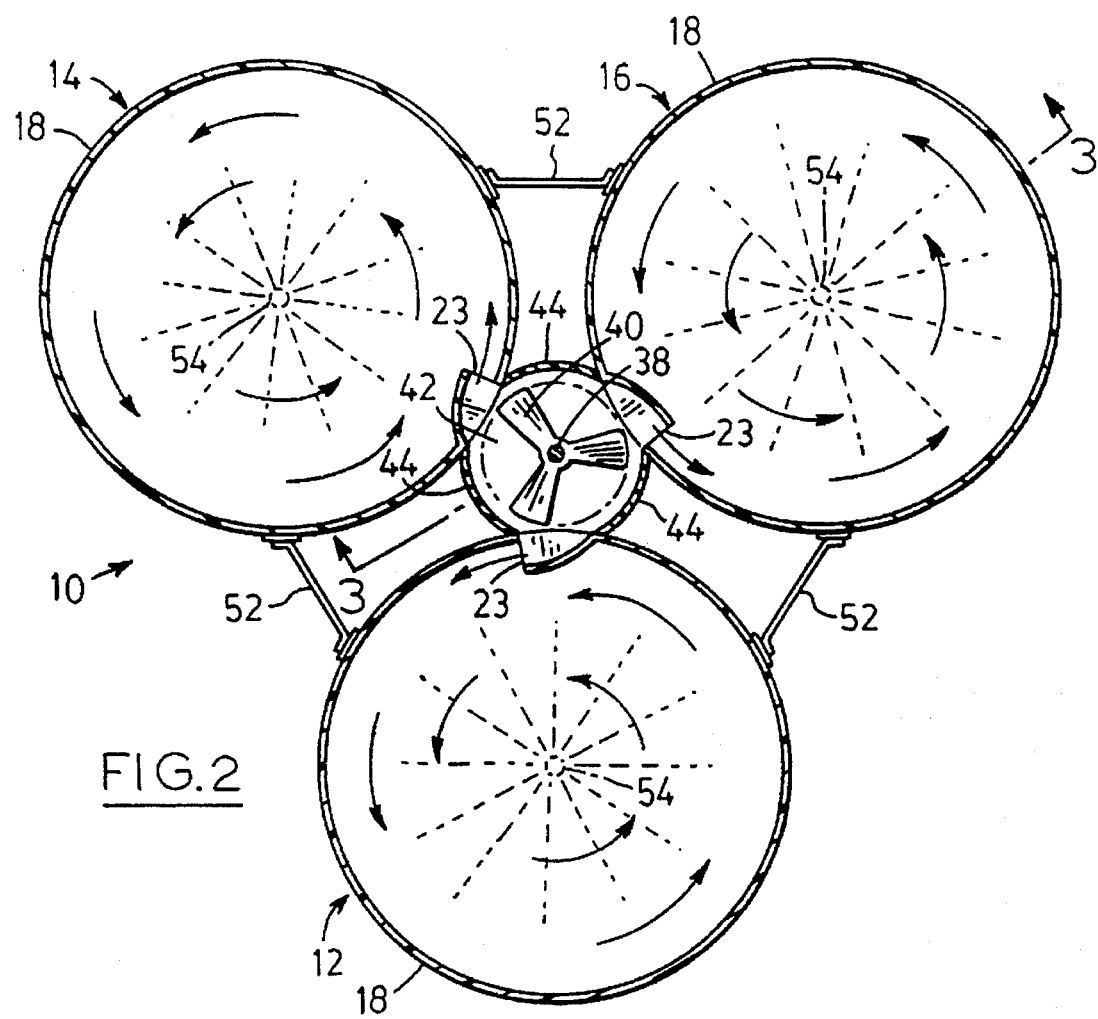
FIG. 2 is a diagrammatic horizontal sectional view of the apparatus to FIG. 1 showing the flow of air in the cells.
Figure 3:
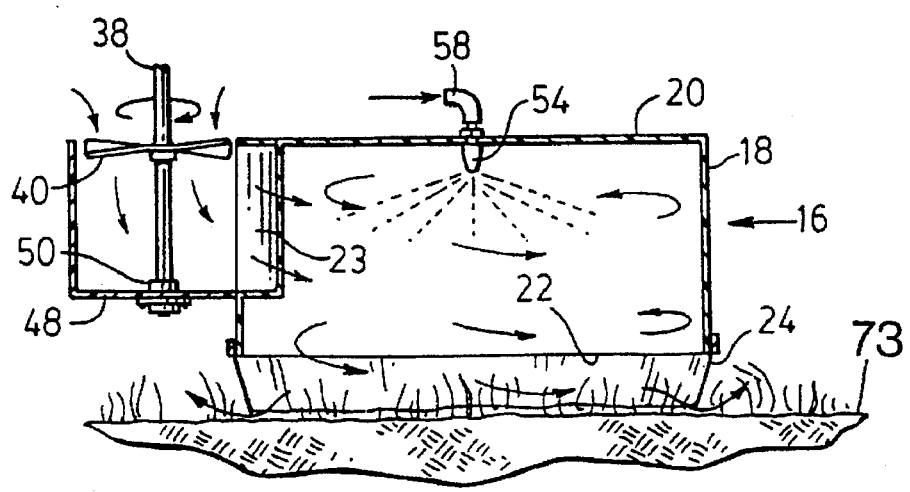
FIG. 3 is a diagrammatic sectional view along the line 3—3 of FIG. 2.

Referring first to FIGS. 1 to 3, mobile air cushioned spraying apparatus in accordance with one embodiment of the invention for spraying liquid chemicals such as herbicides or fungicides onto a grass area such as a golf course comprises a unit 10 with three air cushion cells 12, 14, 16. The cell 12 is a leading cell relative to the direction of travel of the apparatus and the cells 14, 16 are side-by-side trailing cells behind the leading cell 12.

Each cell 12, 14, 16 has a cylindrical rigid body 18 of plastic material with a closed upper end 20 and an open lower end 22. The body 18 has an air inlet 23 adjacent its upper end. A short flexible skirt 24 of a suitable material is secured to and extends around the periphery of the open lower end of the cylindrical body 18 in a manner which will be readily apparent to a person skilled in the art. In this embodiment, when the apparatus is in use, a flexible skirt 24 extends downwardly at an angle of approximately 15° to the vertical.

The three cells, 12, 14, 16 are connected by a connecting plate 26 secured by fasteners 28 to the upper closed ends 20 of the cells. Connecting plate 26 has a central aperture 30, and a motor mounting plate 32 is supported above the connecting plate 26 over the central aperture 30 by three legs 34. The mounting plate 32 carries a gasoline-powered motor 36. Alternatively, a hydraulic motor could be used. The motor 36 has a downward extending vertical output shaft 38 which carries an axial fan 40. Alternatively, a squirrel cage fan could be used. The fan 40 is adjacent the inlets 23 of the cell bodies 18 and is located in a chamber 42 formed by the three cell bodies 18 and three side walls 44 each extending between and secured to respective pair of cell bodies 18. The lower end of chamber 42 is closed by bottom member 48 which carries a bearing 50 for the lower end of motor shaft 38. The cells 12, 14, 16 are also connected together by three struts 52 extending between and secured to respective adjacent pairs of cell bodies 18.

A spray nozzle 54 is located in the center of each cell upper end 20 and projects downwardly into the cell body 18. Each nozzle 54 is connected by a supply line 58 to a supply pipe 60 which contains a flow meter 62 and stop valve 65, the supply pipe 60 being connected to a spray pump 64 and spray supply container 66 mounted on a separate vehicle such as a two-wheeled trolley 68.

The spraying apparatus (like the trolley 68) is manually movable and has a handle 70 pivotally connected by bolt 72 to lugs 74 carried by the connecting plate 26. A wheel 76 is mounted by means of a bracket 78 on the exterior of each of the cell bodies 18 of the rearward cells 14, 16 adjacent their lower ends so that the wheels 76 engage the ground, when the air cushion cells are not in operation, to enable the apparatus to be easily moved.

In use, the operator maneuvers the spraying apparatus and the spray supply trolley 68. The spray pump 64 is operated to supply the required liquid chemical from the tank 66 under pressure to supply pipe 60. The apparatus operator starts motor 36 to rotate the fan 40 and thereby cause air to be driven from the atmosphere downwardly through aperture 30 in the support plate 26 and forced under pressure into the cells 12, 14, 16 through the inlets 23. The inlets 23 are shaped in such a manner that the air enters each cell body 18 in a substantially tangential manner. The fan 40 pressurizes the interior of the cells 12, 14, 16 so that the cell bodies 18 and flexible skirts 24, which previously had been resting on the ground 73, rise until air passes from the interior of the cell bodies 18 to the atmosphere between the flexible skirts 24 and the ground 73, thereby creating an air cushion effect which supports the apparatus by means of air cushions under each cell 12, 14, 16. The wheels 76 are thus lifted off the ground 73 when the air cushions are operating.

The apparatus can be pushed over the ground very easily to effect spraying. The apparatus operator opens the stop valve 65 so that liquid spray chemical is supplied through supply lines 58 to the nozzles 54. Spray from the nozzle 54 becomes entrained in the air injected by the fan 40 horizontally and tangentially into each body 18. The air with entrained spray then follows a downward helical path (indicated by arrows) towards the open lower end 22 and then passes through the gap between the bottom of the skirt 24 and the ground 73. Such a downward helical path of the air entrained spray within the cell body 18 causes the spray to thoroughly contact the vegetation within the cell body 18.

It will be noted that the path travelled by the first cell 12 overlaps the paths taken by the cells 14, 16. Also, if the ground rises under one or more cells and not under one or more of the other cells, the air pressure will rise in the first mentioned cell or cells because less air will escape therefrom between the flexible skirt and the ground. Thus, such cells will tend to rise in a vertical sense, thereby enabling the unit to pass more easily over uneven ground. In one specific example of this embodiment, the cell bodies each have a diameter of 3 feet and a height of 1.5 feet.

Figure 4:
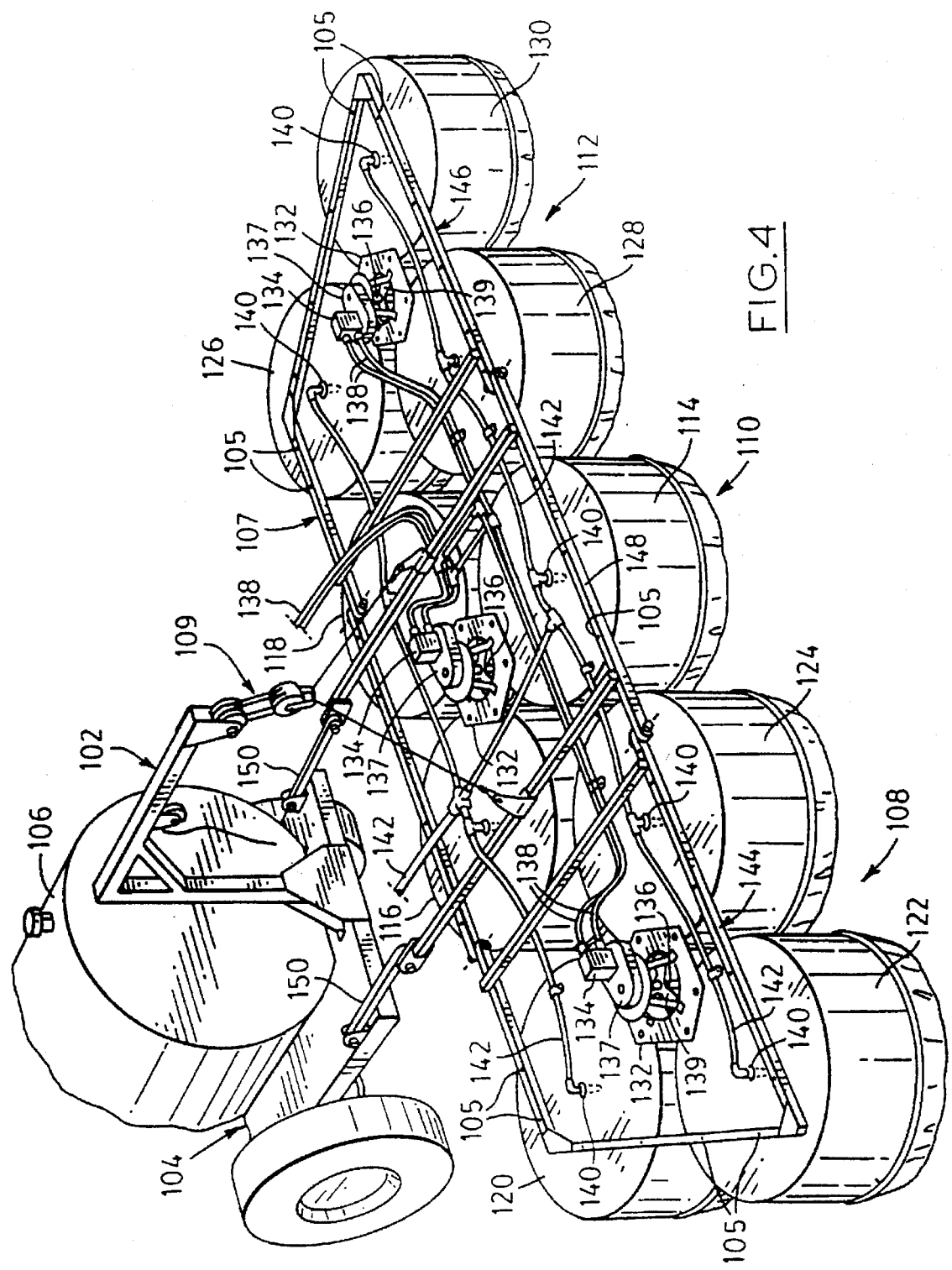
FIG. 4 is a perspective view of an air cushioned spraying apparatus in accordance with another embodiment of the invention.

FIG. 4 shows another embodiment in which the air cushioned spraying apparatus is suspended from a derrick 102 mounted on a trailer 104 carrying a spray liquid supply tank 106, which in use will be towed by a tractor in a similar manner to that described in previously mentioned U.S. Pat. No. 4,274,589. The spraying apparatus comprises a frame 107 which is suspended from the derrick 102 by a cable and pulley arrangement 109, again in a similar manner to that described in U.S. Pat. No. 4,274,589. Three three-celled units 108, 110, 112, each similar to the three cell unit of the previous embodiment, are suspended from the frame 107 which is secured by fasteners 105 to the upper closed end of the cells.

The central unit 110 has a single cell 114 behind the other two cells, 116, 118, whereas the two side units 108, 112 have a single cell 120, 126 respectively in front of the two cells, 122, 124 and 128, 130 respectively. Besides their attachment to the frame 107, the cells of each unit are connected by a support plate 132 which carries a motor 134 with an output shaft 136 carrying a fan 139 for supplying air to the cells in the same manner as in the previous embodiment. In this embodiment however, each motor 134 is a hydraulic motor connected by fluid pressure supply and return lines 138 to a hydraulic pump (not shown) on the tractor. Hydraulic motor 134 drives the output shaft 136 through a transmission 137. Each cell has a spray nozzle 140 connected by the supply lines 142 to a spray pump (not shown) on the trailer 104.

If desired, the side portions 144, 146 of the frame may be pivotally connected to the central portion 148 so that the side portion 144, 146 can be folded upwardly when not in use to enable the apparatus to pass through narrow openings. The central portion 148 may be laterally stabilized by struts 150 pivotally connected thereto and to the trailer 104.

The spraying apparatus in accordance with the second embodiment operates in a similar manner to the spraying apparatus of the first embodiment and likewise easily adapts to uneven ground.

Thus the invention provides air cushioned spraying apparatus with inherent pitch and roll stability. It will be understood that the chemicals sprayed may be in liquid or particulate form.

Other embodiments will be readily apparent to a person skilled in the art, the scope of the invention being defined in the appended claims.

I claim:

1. Air cushioned spraying apparatus for spraying vegetation with chemicals while being supported above the ground by an air cushion effect, said apparatus comprising:

a unit with at least three air cushion cells, each cell having a substantially cylindrical rigid body with a closed upper end and an open lower end, and a flexible skirt secured to and extending around the periphery of the open lower end of the rigid body, each cell also having a spray nozzle projecting downwardly into the body from the closed upper end and an air inlet in the body adjacent the upper end thereof, said unit also having connecting means connecting the at least three cells of the unit such that, when the apparatus is in use and moving in a direction of travel, the path of travel of each cell laterally overlaps the path of travel of another cell, supply means for supplying chemicals to the spray nozzles, and air supply means for supplying air under pressure to said at least three cell inlets to cause air to pass therethrough and downwardly in each cell body to disperse the chemicals from the nozzle onto vegetation within the lower open end of the cell and to cause air to pass from the cell between the flexible skirt and the ground to create an air cushion effect.

2. Air cushioned spraying apparatus according to claim 1 wherein said unit has only three cells and consists of a pair of side-by-side cells and a third cell forwardly or rearwardly thereof relative to the direction of travel.

3. Air cushioned spraying apparatus according to claim 1 wherein said connecting means comprises, a support means connected to the closed upper ends of the at least three cells.

4. Air cushioned spraying apparatus according to claim 3 wherein the air supply means comprises a motor and fan carried by said support means.

5. Air cushioned spraying apparatus according to claim 1 wherein the at least three cell inlets are shaped to cause air under pressure to enter into the at least three cells in a substantially tangential manner.

6. Air cushioned spraying apparatus according to claim 2 having three said units, one of said units being a middle unit with the third cell rearwardly of the other two cells, and two other of said units, one on each side of the middle unit, the third cell of each other unit being forwardly of the other two cells in the unit.

* * * * *